United States Patent [19]

Takeda

[11] Patent Number: 5,648,800

[45] Date of Patent: Jul. 15, 1997

[54] METHOD AND APPARATUS FOR RECORDING WITH VARYING RECORDING SPEEDS

[75] Inventor: Tomoyuki Takeda, Yokohama, Japan

[73] Assignee: Canon Kabushiki Kaisha, Tokyo, Japan

[21] Appl. No.: 2,020

[22] Filed: Jan. 8, 1993

[30] Foreign Application Priority Data

Jan. 13, 1992 [JP] Japan .................................. 4-003623

[51] Int. Cl.$^6$ .............................. G01D 9/28; G01D 9/36; H04N 1/21
[52] U.S. Cl. .......................... 346/45; 358/296; 358/297
[58] Field of Search ................................ 358/296, 300, 358/302, 412, 297; 347/237, 240, 247, 251

[56] References Cited

U.S. PATENT DOCUMENTS

| 4,963,884 | 10/1990 | Kiguchi et al. . | |
| 5,193,007 | 3/1993 | Yokoyama et al. | 358/296 |
| 5,198,909 | 3/1993 | Ogiwara et al. | 358/412 |

FOREIGN PATENT DOCUMENTS

| 58-211473 | 12/1983 | Japan . | |
| 623969 | 1/1987 | Japan . | |
| 0095964 | 4/1988 | Japan | 346/76 PH |

Primary Examiner—Benjamin R. Fuller
Assistant Examiner—Raquel Yvette Gordon
Attorney, Agent, or Firm—Fitzpatrick, Cella, Harper & Scinto

[57] ABSTRACT

A recording apparatus for recording input image data on a recording medium includes: a buffer memory for storing a plurality of lines of input image data as recording data; a recording section which can record on the basis of the recording data at different speeds; and a speed storage section storing a plurality of recording speeds at which recording is performed by the recording section, one of the recording speeds stored in the speed storage section being selected as the recording speed for the recording section in accordance with the amount of recording data stored in the buffer memory. That is, when the amount of recording data stored in the buffer memory is larger than a predetermined number of lines $\alpha_1$, uniform-speed recording is performed at a first recording speed, and when the amount has become smaller than the number of lines $\alpha_1$, uniform-speed recording is performed at a second, slower recording speed. When, afterwards, the amount of recording data in the buffer memory has become larger than a second predetermined number of lines $\alpha_2$ ($>\alpha_1$), the recording speed is switched back to the first recording speed, at which uniform-speed recording is performed, thereby making it possible to prevent deterioration in recording quality due to variation in the recording period of the input image data while using a small-capacity memory.

20 Claims, 6 Drawing Sheets

METHOD AND APPARATUS FOR RECORDING WITH VARYING RECORDING SPEEDS

BACKGROUND OF THE INVENTION

1. Field of the Invention

This invention relates to a recording method and a recording apparatus for recording data transmitted in irregular periods.

2. Description of the Related Art

In contrast to printers which record on the basis of recording data transmitted in regular periods, printers used in facsimile apparatuses or the like have generally had the following problems. In the case of a facsimile apparatus, for example, recording data is generated from received data in periods which vary depending upon the period in which the received data is received or the period in which the received data is decoded, with the result that the recording period for the recording data also varies. This is particularly true in the case of an interval between ECM reception blocks in facsimile reception or in the case of the reception of a half-tone document image. In such cases, the processing of the received data takes a long time, resulting in an extremely long recording time period. The printer section of a facsimile apparatus generally employs a thermal-transfer-type printer, which records by heating the ink of an ink sheet by means of a thermal head to transfer it onto recording paper. Thus, such a long recording period results in a reduction in the temperature of the ink sheet and the thermal head before the recording of the next line, thereby reducing the recording density of the next line. Further, when the recording period is long, the motors for feeding the ink sheet and the recording paper are operated to record the next line after having remained completely at rest, with the result that unevenness is generated in the feeding of the ink sheet and the recording paper, thereby deteriorating the recording quality.

To solve these problems, various measures have been proposed. For example, when the interval between the recording of one line and the formation of recording data for the next line is long, the thermal head is re-heated in accordance with the same data as used in the previous recording without feeding of the recording paper again (post-heating), or the thermal head is heated immediately before the recording of the next line to such a degree as not to cause it to record (pre-heating) (U.S. Pat. No. 4,963,884 and Japanese Patent Laid-Open Publications No. 62-3969 and 58-211473). However, even with such pre-heating or post-heating control, it has been impossible to obtain satisfactory recording quality. In the case of multi-printing, in particular, other problems may arise in addition to the deterioration in the recording quality as mentioned above. In multi-printing, which uses an ink sheet (a multi-print sheet) which permits image recording a plurality of (m) times, recording of a document having a length L is performed by feeding the ink sheet a feed length smaller than the length L (i.e., L/m). In this process, the ink sheet and the recording paper are apt to stick to each other, or an ink trail may be left on the recorded image.

To prevent the deterioration in recording quality mentioned above, a method is known in which a buffer memory for storing a plurality of lines of recording data is provided. This buffer memory compensates for the variation in the recording period of the received data, and the recording data is read from the buffer memory and recorded at uniform speed. However, to compensate for the variation in the period of the recording data and record the same at a completely uniform speed, a considerable memory capacity (e.g., approximately 8M bytes) is required. Apart from this method, another method has been proposed in which a plurality of small-sized buffer memories are provided so as to realize a uniform-speed recording by switching between these memories (U.S. Ser. No. 862,417, filed on Apr. 2, 1992). However, as stated above, data is received in facsimile communication at irregular periods, so that, if, at the time of buffer switching, it takes a long time for the recording data to become ready for recording in the next buffer, the recording operation will be suspended at that time.

SUMMARY OF THE INVENTION

The present invention has been made in view of the above problems. It is an object of this invention to provide a recording method and a recording apparatus which have been improved over the prior art.

Another object of this invention is to provide a recording method and a recording apparatus which are capable of preventing deterioration in recording quality attributable to variation in the recording period of the input image data.

Still another object of this invention is to provide a recording method and a recording apparatus which make it possible to perform uniform-speed recording with a small memory capacity.

A further object of this invention is to provide a recording method and a recording apparatus in which a plurality of lines of input image data is stored as recording data and, in accordance with the amount of the stored recording data, one of plural preset recording speeds is selected, recording being effected on the basis of the recording data at the selected recording speed.

The above and other objects of the present invention will become apparent from the accompanying drawings and the following description.

In one aspect of the invention, a recording apparatus includes a storage device for storing recording data corresponding to input image data, a recording device for recording an image on a recording medium on the basis of the recording data stored in the storage device, with the recording device being operable at more than one recording speed, and a control device for changing the recording speed of the recording device in accordance with an amount of recording data stored in the storage device.

In another aspect of the present invention, a recording method includes the steps of storing recording data corresponding to input image data in a storage device, detecting an amount of recording data stored in the storage device, determining a recording speed in accordance with the amount of recording data detected in the detecting step, and performing recording on the basis of the recording data stored in the storage device at the recording speed determined in the determining step.

In yet another aspect of the present invention, a recording apparatus includes an input section for inputting image data, a storage device for storing recording data corresponding to the input image data, a recording device for recording an image on a recording medium on the basis of the recording data stored in the storage device, with the recording device being operable at more than one recording speed, and a control device for changing the recording speed of the recording device in accordance with an amount of recording data stored in the storage device.

DETAILED DESCRIPTION OF THE PREFERRED EMBODIMENT

A preferred embodiment of the present invention will now be described in detail with reference to the accompanying drawings.

Figure 1:
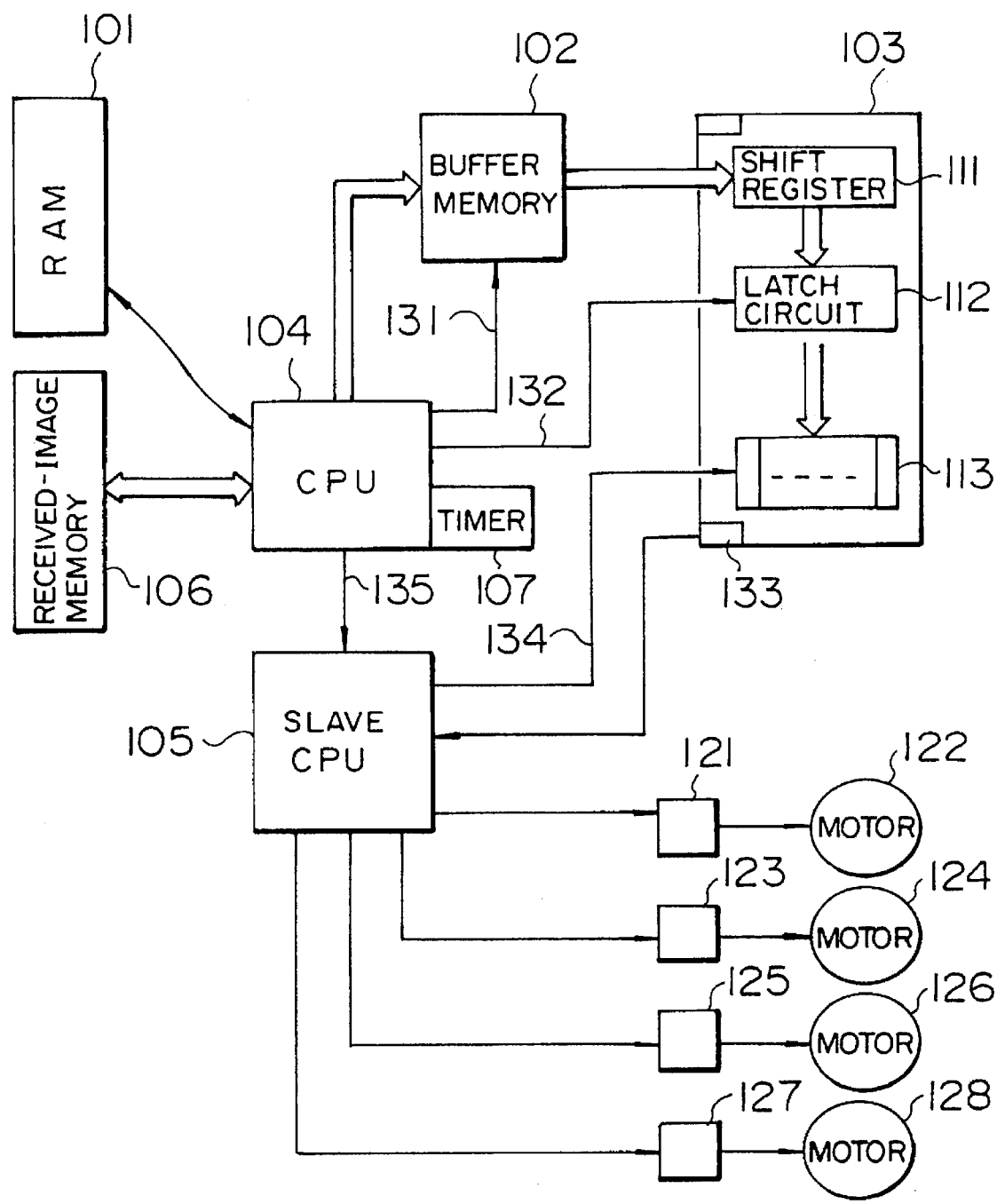
FIG. 1 is a block diagram showing the construction of the control section and the recording section of a facsimile apparatus according to an embodiment of this invention.
Figure 2:
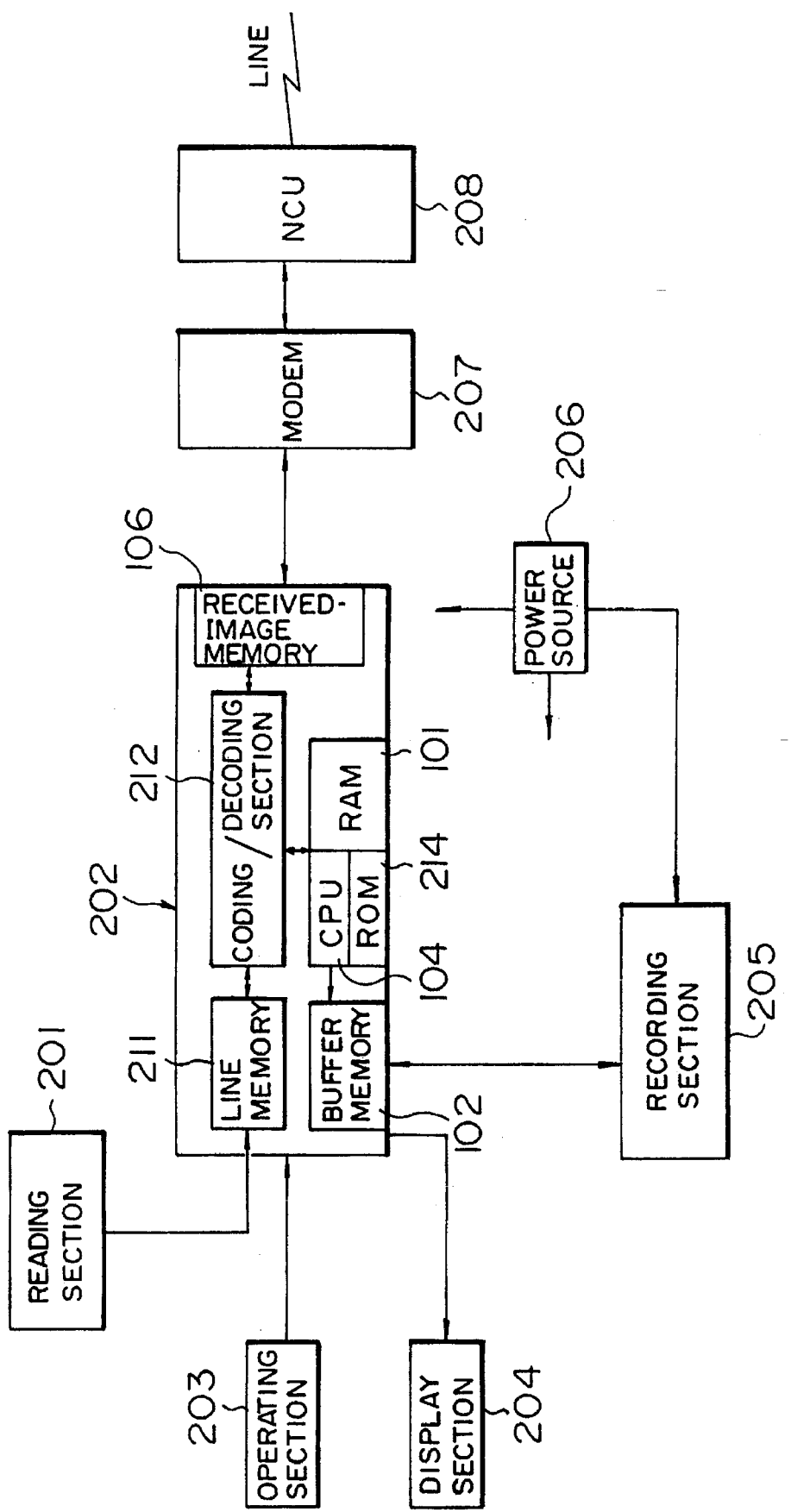
FIG. 2 is a block diagram showing the general construction of the facsimile apparatus of this embodiment.
Figure 3:
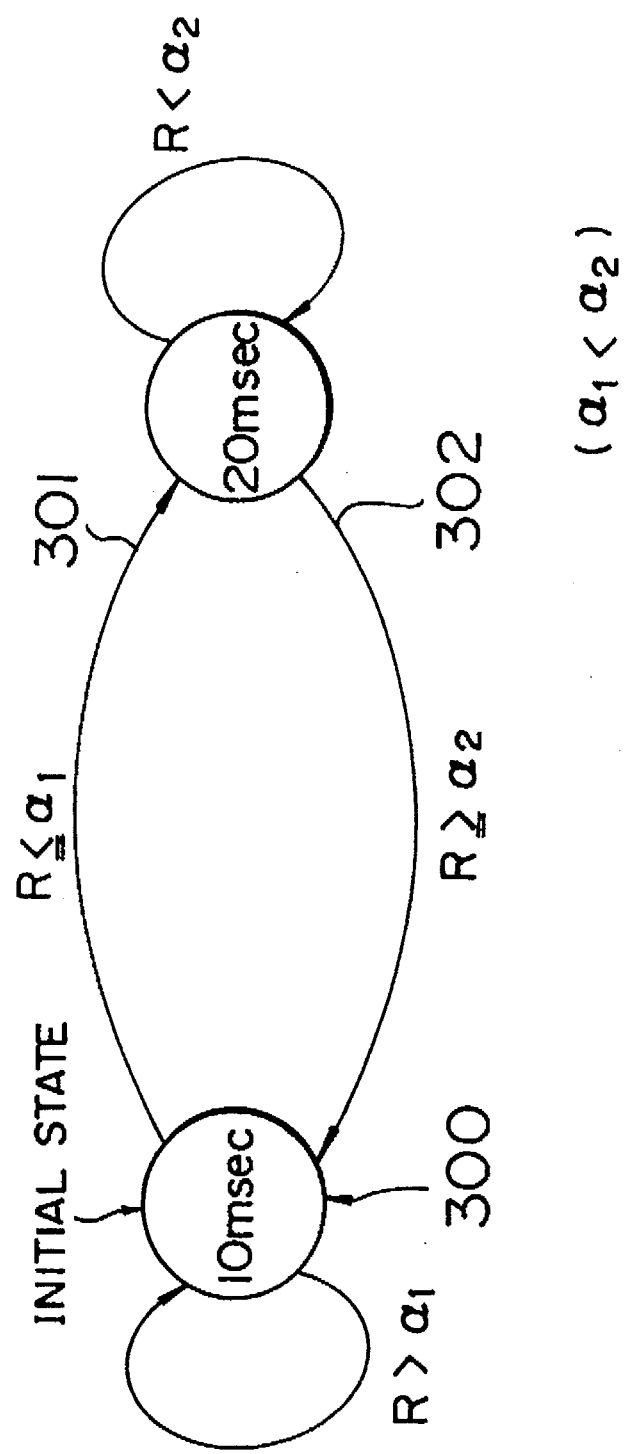
FIG. 3 is a diagram showing how the recording period is changed in the facsimile apparatus of this embodiment.

FIGS. 1 to 3 are diagrams schematically illustrating a facsimile apparatus according to an embodiment of this invention. FIG. 1 is a block diagram showing in detail the control section and the recording section of the facsimile apparatus of this embodiment. FIG. 2 is a block diagram schematically showing the construction of the facsimile apparatus of this embodiment. FIG. 3 is a chart showing how the recording period is changed depending upon the number of lines stored in buffer memory.

First, the construction of the facsimile apparatus of this embodiment will be schematically described with reference to FIG. 2.

Referring to FIG. 2, numeral 201 indicates a reading section for reading documents photoelectrically to convert them to digital image signals, which are supplied to a control section 202. In a copying mode, these digital image signals are supplied to a recording section 205 by way of the control section 202 so as to be recorded. In a facsimile mode, the signals are coded by the control section 202 and supplied to a communication line through a modem 207 and an NCU (net control unit) 208.

Next, the construction of the control section 202 will be described. Numeral 211 indicates a line memory for storing image data from the reading section 201 or the data of each line of decoded image data. When a document is transmitted (in the case of the facsimile mode) or copied (in the case of the copying mode), one line of image data from the reading section 201 is stored in the memory. When facsimile image data is received, one line of the received image data, which has been decoded, is stored. The stored data is supplied to the recording section 205 by way of a buffer memory 102 so as to effect image formation. Numeral 212 indicates a coding/decoding section for coding image information to be transmitted, by MH-coding or the like, and for decoding the received coded image data to convert it to image data. Numeral 106 indicates a received-image memory for storing the received coded image data. These sections, which constitute the control section 202, are controlled, for example, by a CPU 104 consisting of a microprocessor or the like. Apart from the CPU 104, the control section 202 includes: a ROM 214 for storing control programs for the CPU 104 and various kinds of data; a RAM 101 for temporarily storing, as a work area for the CPU 104, a recording period T and various kinds of data described below; and a buffer memory 102 described below which consists of RAM or the like.

The recording section 205 is equipped with a thermal line head 103 (having a plurality of heating elements 113 arranged over a width that is approximately the same as the recording width (FIG. 1)) and performs image recording on recording paper by the thermal transfer recording method. Numeral 203 indicates an operating section including command keys for various functions, keys for inputting telephone numbers, etc. Numeral 204 indicates a display section for the facsimile apparatus. Numeral 206 indicates a power source for supplying the entire apparatus with electricity. Numeral 207 indicates a modem (modulator-demodulator) for performing conversion of facsimile signals transmitted and received. Numeral 208 indicates an NCU (net control unit) for controlling the communication of the apparatus with an external communication line.

FIG. 1 is a diagram showing in detail the control section 202 and the recording section 205 of the facsimile apparatus of this embodiment. In the drawings, those components which are common to the other drawings are indicated by the same reference numerals.

The thermal head 103 is a line head, which includes: a shift register 111 for inputting one line of serial recording data from the control section 202; a latch circuit 112 for retaining by latching one line of recording data of the shift register 111; and a heating element having heating resistors 113 for one line. When one line of data is recorded, the heating resistors 113 are driven in four blocks. Numeral 133 indicates a temperature sensor attached to the thermal head 103 in order to detect the temperature of the same. A detection signal from this temperature sensor 133 is input to a slave CPU 105, which changes the pulse width of a strobe signal 134 in accordance with the detection signal from the temperature sensor 133 so as to control the length of time for energizing the heating elements 113, or changes the driving voltage for the thermal head 103, etc. So as to change the energy to be applied to the thermal head 103 in accordance with the temperature of the same. Numeral 107 indicates a programmable timer, which supplies an interrupt signal, a time-out signal, etc. to the CPU 104 at designated intervals.

The buffer memory 102 stores a plurality of lines of image data which has been read from the received-image memory 106 and decoded by the decoding section 212. The capacity of the buffer memory 102 varies depending upon the speed at which recording is performed by the thermal head 103. In this embodiment, there are two recording periods: 10 msec. and 20 msec., and the capacity of the buffer memory 102 is 256 Kbytes, which corresponds to 1024 lines. Numeral 131 indicates a data transfer start signal for causing recording data to be transferred from the buffer memory 102 to the thermal head 103.

The slave CPU 105 controls the motors in the recording section 205 and supplies the strobe signal 134 to the heating resistors 113 of the thermal head 103. The slave CPU 105 starts its control operation upon receiving a signal such as recording command 135 from the CPU 104. Numeral 122 indicates a motor for feeding recording paper; numeral 121 indicates a driver circuit for driving the motor 122; numeral 124 indicates a motor for feeding ink sheets; and numeral 123 indicates a driver circuit for driving the motor 124. Numeral 126 indicates a motor for feeding documents; numeral 125 indicates a driver circuit for driving the motor 126; numeral 128 indicates a motor for driving a cutter and discharging paper; and numeral 127 indicates a driver circuit for driving the motor 128.

FIG. 3 is a chart showing how, in the facsimile apparatus of this embodiment, the recording period is switched in accordance with the number of lines (R) of the image data stored in the buffer memory 102 when there are two recording periods of 10 msec. and 20 msec. It is assumed that the minimum receiving period of each line of the transmitted facsimile image data is 10 msec. In this embodiment, transmission in a special mode, such as blank-line skipping, is not taken into consideration. Accordingly, the minimum interval between the reception of one line of facsimile data and the reception of the next line of facsimile data is 10 msec.

In this embodiment, data transfer from the buffer memory 102 to the thermal head 103 to start recording is effected when the buffer memory 102 has become full (i.e., when 1024 lines of data have become ready for recording) after the starting of reception. Thus, as indicated at 300, the recording period in the initial state is 10 msec. This prevents the buffer memory 102 from overflowing and making the recording of received data impossible since it takes at least 10 msec. for one line of recording data to be transferred from the CPU 104 to the buffer memory 102 (that is, as stated above, the minimum transfer time is 10 msec.).

Assuming that lines which take a long time to be transmitted have followed in succession, and that the data receiving speed has become lower than the recording speed of the recording section 205, thereby reducing the number of remaining lines of image data R stored in the buffer memory 102 to $\alpha_1$ or less, the recording period is switched to 20 msec., as indicated at 301 and the recording speed is decreased, thereby preventing the buffer memory 102 from becoming empty. When, afterwards, lines requiring short transfer time have followed one upon another, and the number of lines R stored in the buffer memory 102 has become $\alpha_2$ or more, as indicated at 302, the recording period is switched back to 10 msec. to increase the recording speed, thereby preventing the recording data in the buffer memory 102 from overflowing ($\alpha_1 < \alpha_2$). In this embodiment, $\alpha_1$ is set at ten lines, and $\alpha_2$ at 612 lines.

Due to this arrangement, recording is effected at a uniform speed of 10 msec. when the buffer memory 102 is full or the remaining amount of data R in the buffer memory 102 is large; when the remaining amount of data R in the buffer memory 102 is small or when the buffer memory 102 has not been filled to a certain extent, recording is effected at a uniform speed of 20 msec. If the values of $\alpha_1$ and $\alpha_2$ are too close to each other, the recording period is frequently switched between 10 msec. and 20 msec., with the result that no positive effect is obtained over the usual recording at irregular periods. If the value of $\alpha_1$ is too small, recording is performed almost entirely at the uniform speed of 10 msec, so that a buffer memory of a large capacity is required, as in the conventional uniform-speed recording. Thus, $\alpha_1$ and $\alpha_2$ must be set at appropriate values before recording can be performed without using a buffer memory of particularly large capacity, solely by switching the recording period for one page between 10 msec. and 20 msec. several times at the most.

Figure 4:
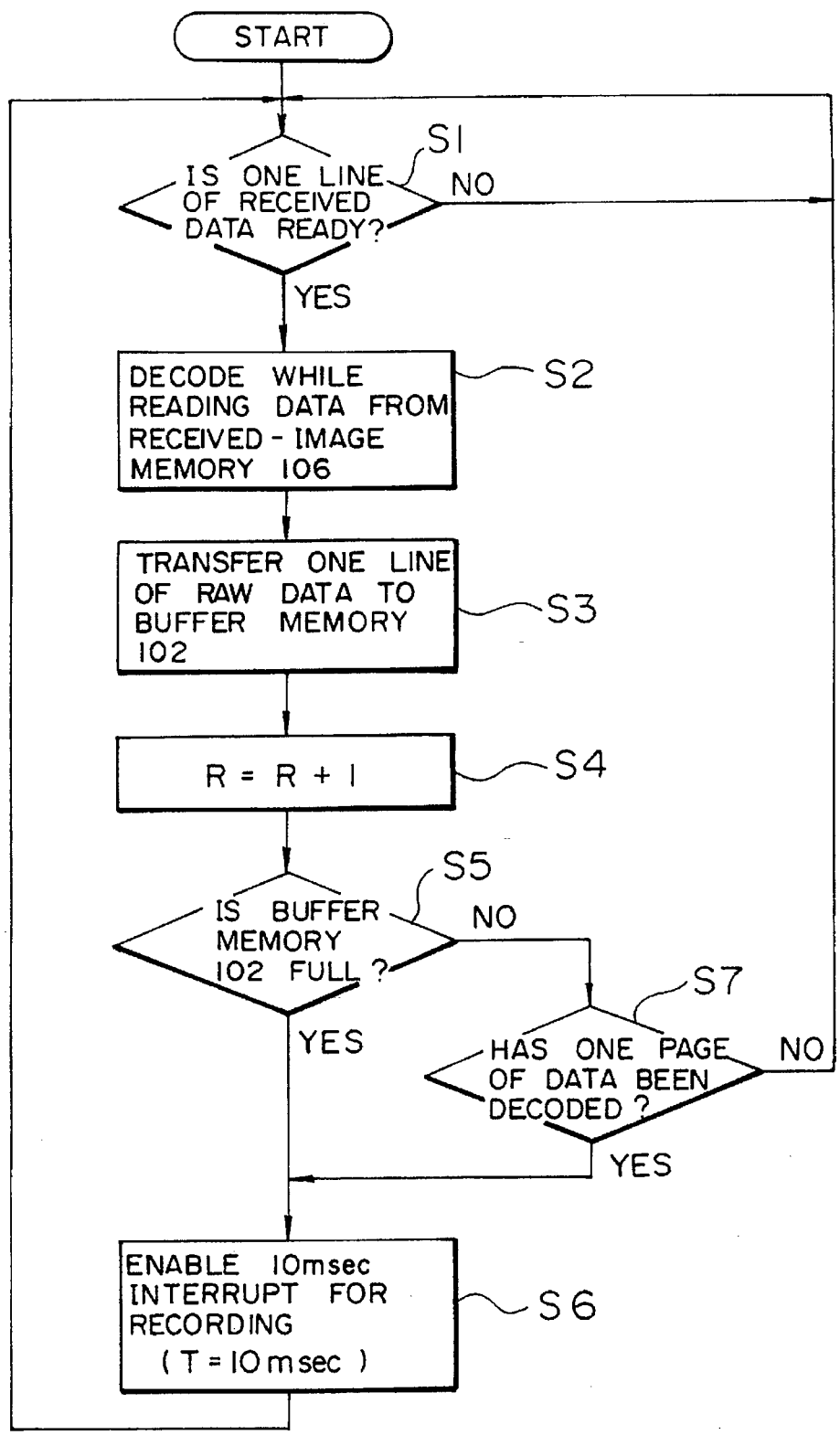
FIG. 4 is a flowchart showing a decoding operation in the slave CPU of the facsimile apparatus of this embodiment.
Figure 5:
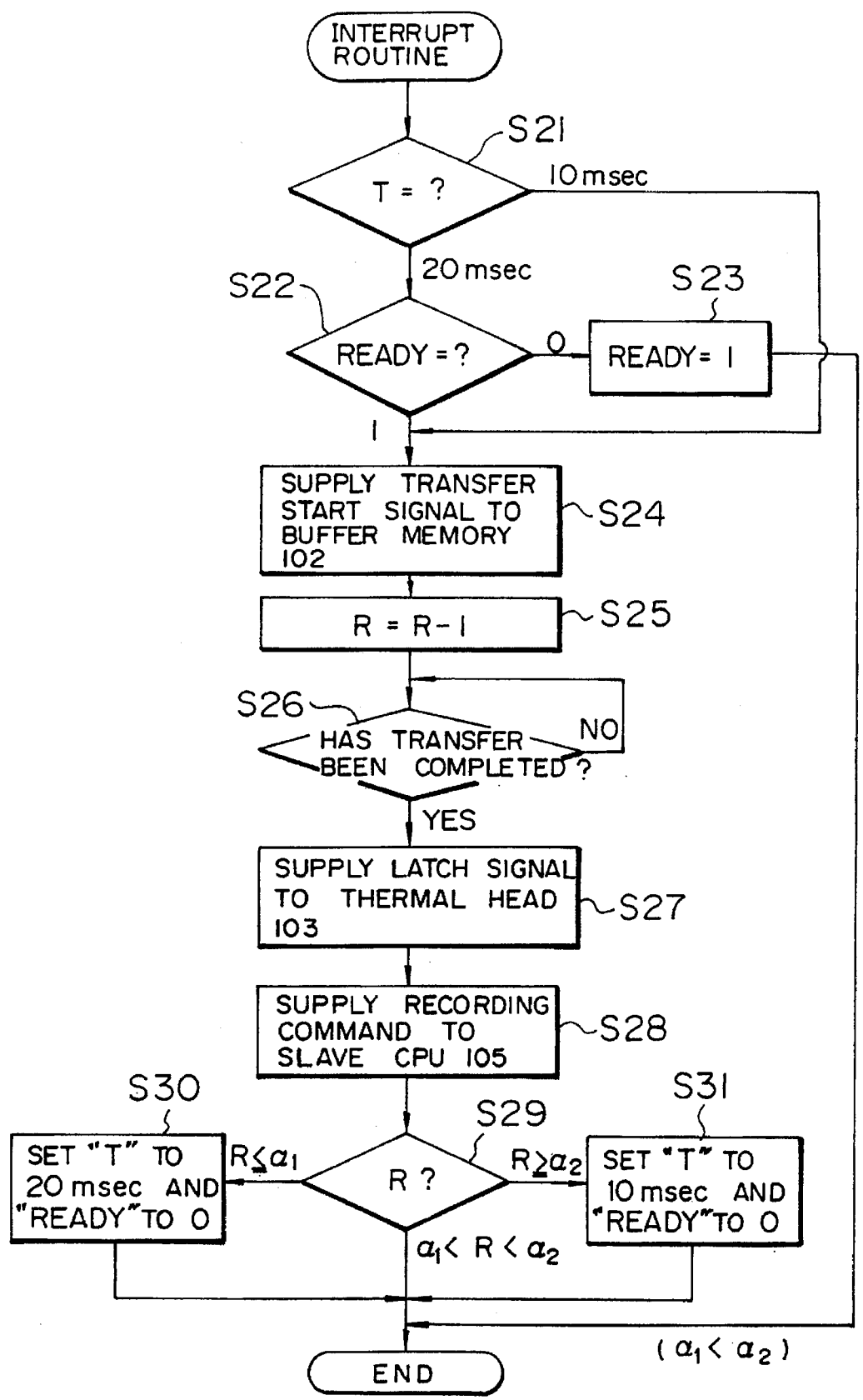
FIG. 5 is a flowchart showing an interrupt processing in the main CPU of the facsimile apparatus of this embodiment.
Figure 6:
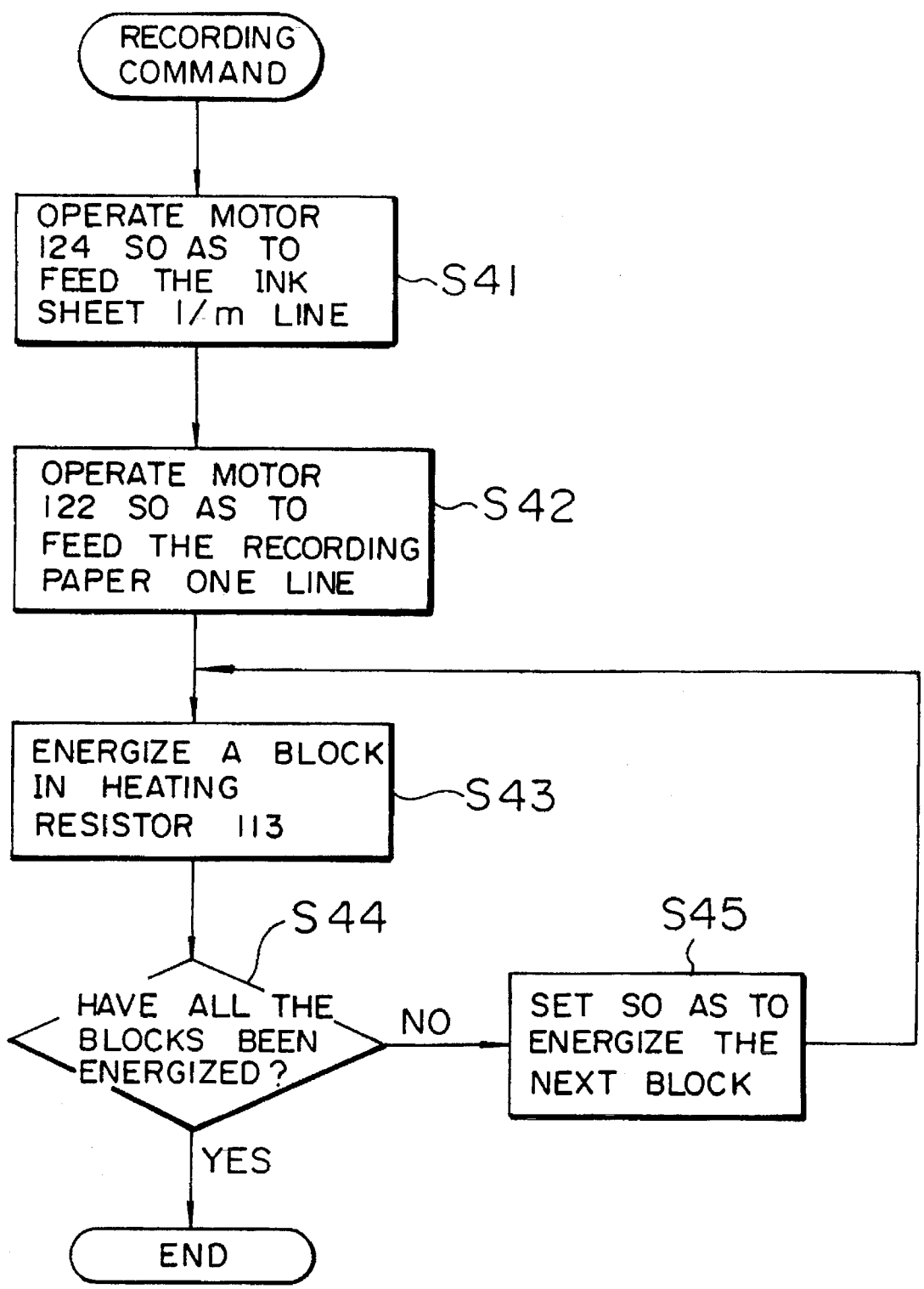
FIG. 6 is a flowchart showing a recording operation in the main CPU of the facsimile apparatus of this embodiment.

FIGS. 4 to 6 are flowcharts illustrating the processes to be executed in the facsimile apparatus of this embodiment, from the decoding of received data to the recording thereof. The control programs for executing these processes are stored in the ROM 214.

FIG. 4 is a flowchart illustrating the processes performed by the CPU 104, from the decoding of coded facsimile reception data (e.g., MMR-coded data) stored in the received-image memory 106 to the transfer of the data to the buffer memory 102.

First, in step S1, facsimile image data is received, and the CPU 104 awaits the termination of one line of received image data being stored in the received-image memory 106. When one line of received image data has been stored, the procedure advances to step S2, where coded data is read from the received-image memory 106 and decoded. In step S3, one line of raw data, generated through the decoding, is transferred to the buffer memory 102. When the transfer of this one line of data has been completed, the procedure advances to step S4, where the value of R indicating the number of lines in the buffer memory 102 is incremented by one (R=R+1). In step S5, a judgment is made as to whether the buffer memory 102 has become full, that is, whether the value of R has reached "1024". If the buffer memory 102 is not yet full, the procedure advances to step S7, where it is checked whether the decoding of one page of received data has been completed. If the decoding of one page has not been completed yet, the procedure returns to step S1.

If the buffer memory 102 has become full in step S5, or the decoding of one page of data has been completed in step S7, the procedure advances to step S6, where an interrupt to set the recording period at 10 msec. (T=10) is enabled (the initializing process indicated at 300 in FIG. 3). This interrupt processing is shown in the flowchart of FIG. 5 and will be described in detail below.

FIG. 5 is a flowchart showing interrupt processing in the facsimile apparatus of this embodiment. It is started by an interrupt request signal supplied from the timer 107 at each 10 msec. interval.

First, it is judged in step S21 whether the recording period T has been set to 10 msec. or 20 msec. The recording period T is stored in the RAM 101 and, in the initial state, is at 10 msec. When the period T is 10 msec., the procedure advances to step S24. When the recording period is 20 msec., a judgment is made in step S22 as to whether the "ready" state is "1" or "0", that is, whether 20 msec. has elapsed since the data transfer of the previous line (this ready state is also stored in the RAM 101). When the ready state is "0", that is, when only 10 msec. has elapsed since the data transfer of the previous line, it is set to "1" in step S23 to complete the interrupt processing. If the ready state is "1" in step S22, that is, if 20 msec. has elapsed since the data transfer of the previous line, the procedure advances to step S24 to execute data transfer processing.

In step S24, a data transfer start signal 131 is supplied to the buffer memory 102 and, in step S25, R is decremented by 1 (R=R-1). Then, in step S26, the CPU 104 awaits termination of one line of data to be transferred to the shift register 111 of the thermal head 103. When the transfer of one line of data to the shift register 111 has thus been completed, the procedure advances to step S27, where a latch signal 132 is supplied to the thermal head 103 to latch the one line of data stored in the shift register 111 in the latch circuit 112. Next, the procedure moves to step S28, where a recording command 135 is supplied to the slave CPU 105. The operation of the slave CPU 105 will be described in detail below with reference to the flowchart of FIG. 6.

Next, the procedure advances to step S29, where the recording period is switched to 10 msec. or 20 msec., as shown in FIG. 3, in accordance with the value of R. That is, when the value of R is smaller than or equal to $\alpha_1$, the procedure advances to step S30, where the recording period T is set to 20 msec., and the ready state is set to "0" to complete interrupt processing. When the value of R is larger than or equal to $\alpha_2$, the procedure advances to step S31, where the recording period T is set to 10 msec., and the ready state is set to "0" to complete the interrupt processing. When the value of R is in neither of the above two ranges, interrupt processing is completed without changing the current recording period.

FIG. 6 is a flowchart illustrating the recording processes executed by the slave CPU 105.

First, in step S41, the ink sheet feeding motor 124 is rotated so as to feed the ink sheet by 1/m (m>1) lines. Then, in step S42, the recording paper feeding motor 122 is rotated so as to feed the recording paper by one line. Next, the procedure advances to step S43, where a strobe signal 134 is supplied to the heating resistors 113 of the thermal head 103 to cause the thermal head 103 to heat. The heating resistors 113 are divided into four blocks. In step S43, the strobe signal 134 is supplied in such a way that only one of these blocks is heated. Afterwards, a judgment is made in step S44 as to whether all the four blocks have been energized. If all the blocks have not been energized yet, the procedure advances to step S45, where the next block is heated, and the procedure returns to step S43. When all the blocks have been energized in step S44, the recording of one line is complete.

The present invention may be applied to a system composed of a single apparatus or a plurality of apparatuses. Further, the method of the present invention is naturally applicable to cases where it can be realized by providing systems or apparatuses with programs for the execution thereof.

Although the above embodiment has been described in connection with a facsimile apparatus, the present invention is not restricted to this. It is applicable to any recording apparatus which records on the basis of data that may be transmitted at irregular periods.

Also, while the recording apparatus of this embodiment has been described as applied to a case where the thermal transfer recording system is used, the present invention is not restricted to this. It is also applicable, for example, to a thermal type printer or an ink-jet type recording apparatus which ejects ink droplets by the application of heat.

As described above, in accordance with this embodiment, a buffer memory is provided which stores a plurality of lines of recording data to be supplied to the recording section, and the recording period is set to one of the predetermined n periods in accordance with the number of lines of recording data stored in the buffer memory, thereby providing the following advantages:

① Since the recording period is set to a predetermined value, it is possible to determine the driving periods of the recording paper feeding motor and the ink sheet feeding motor beforehand in accordance with the recording period, whereby recording can be performed with a preset energization period (the pulse width of the strobe signal) for the thermal head.

② Since recording is performed at a uniform speed until the recording period is switched, generation of unevenness in recording density can be prevented, thereby attaining an improvement in recording quality.

③ When the remaining capacity of the buffer memory has become small, the recording period is shortened, and when the remaining amount of recording data stored in the buffer memory is small, the recording period is increased. Due to this arrangement, the buffer memory can be utilized efficiently, and it is possible to record, at least partly at a uniform speed, without providing a large-capacity memory (e.g., a paper buffer) as in conventional uniform-speed recording. Further, when the remaining amount of recording data stored in the buffer memory has become small, the recording period can be lengthened, so that it is possible to avoid the interruption of recording in the middle of a page as a result of the buffer memory being empty. Thus, when a plurality of conventional small-size buffer memories are provided, it is possible to avoid the interruption of recording in the middle of a page to cause generation of white streaks on the image, thus achieving an improvement in recording quality.

The individual components shown in outline and designated by blocks in the drawings are all well-known in the image recording arts and their specific construction and operation are not critical to the operation or best mode of carrying out the invention.

While the present invention has been described with respect to what is currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed:

1. A recording apparatus comprising:

storage means for storing recording data corresponding to input image data;

recording means for recording an image on a recording medium on a basis of the recording data stored in said storage means, said recording means being operable at more than one recording speed, wherein said recording means performs recording of portions of the recording data stored in said storage means while other portions of the recording data are being stored in said storage means;

detecting means for detecting an amount of recording data stored in said storage means and not yet recorded; and control means communicating with said recording means and said storage means for changing a recording speed of said recording means interrelatedly with the amount of the recording data not yet recorded, detected by said detecting means.

2. A recording apparatus according to claim 1, wherein said control means decreases the recording speed when the amount of recording data stored in said storage means has become no more than a first predetermined amount.

3. A recording apparatus according to claim 2, wherein said control means increases the recording speed when, after becoming no more than the first predetermined amount, the amount of recording data stored in said storage means has increased to at least a second predetermined amount.

4. A recording apparatus according to claim 3, wherein the second predetermined amount is larger than the first predetermined amount.

5. A recording apparatus according to claim 1, wherein said input image data comprises coded data, and said apparatus further comprises decoding means communicating with said control means for decoding the input image data to convert the input image data to a recording data.

6. A recording apparatus according to claim 1, wherein said recording means includes a recording head for recording images on the recording medium by using heat energy.

7. A recording apparatus according to claim 6, wherein said recording head acts on an ink sheet to transfer ink contained in the ink sheet onto the recording medium.

8. A recording method comprising the steps of:

storing recording data corresponding to input image data in a storage means;

detecting an amount of recording data stored in the storage means and not yet recorded;

determining a recording speed interrelatedly with the amount of recording data not yet recorded, detected in said detecting step; and performing recording on a basis of the recording data stored in the storage means at the recording speed determined in said determining step, wherein portions of the recording data stored in the storage means are recorded in said recording performing step while other portions of the recording data are being stored in the storage means in said storing step.

9. A recording method according to claim 8, wherein the recording speed is decreased when the amount of recording data detected in said detecting step has become no more than a first predetermined amount.

10. A recording method according to claim 9, wherein the recording speed is increased when, after becoming smaller than the first predetermined amount, the amount of recording data stored in the storage means is detected to have increased to at least a second predetermined amount.

11. A recording method according to claim 10, wherein the second predetermined amount is larger than the first predetermined amount.

12. A recording method according to claim 8, wherein the image data comprises coded data, and said method further comprises a step of decoding the image data to obtain the recording data.

13. A recording method according to claim 8, wherein an image is recorded on a recording medium in said recording performing step by using heat energy.

14. A recording method according to claim 13, wherein in said recording performing step ink contained in an ink sheet is transferred onto the recording medium by the heat energy.

15. A recording apparatus comprising:

input means for receiving image data;

storage means for storing recording data corresponding to the input image data;

recording means for recording an image on a recording medium on a basis of the recording data stored in said storage means, said recording means being operable at more than one recording speed, wherein said recording means performs recording of portions of the recording data stored in said storage means while other portions of the recording data are being stored in said storage means;

detecting means for detecting an amount of the recording data stored in said storage means and not yet recorded; and control means communicating with said recording means and said storage means for changing a recording speed of said recording means interrelatedly with the amount of the recording data not yet recorded, detected by said detecting means.

16. A recording apparatus according to claim 15, wherein said control means decreases the recording speed when the amount of recording data stored in said storage means has become no more than a first predetermined amount.

17. A recording apparatus according to claim 16, wherein said control means increases the recording speed when, after becoming no more than the first predetermined amount, the amount of recording data stored in said storage means has increased to at least a second predetermined amount.

18. A recording apparatus according to claim 17, wherein the second predetermined amount is larger than the first predetermined amount.

19. A recording apparatus according to claim 15, wherein said recording apparatus is a facsimile apparatus and said input means receives facsimile signals from an external communication line.

20. A recording apparatus according to claim 15, wherein said recording apparatus is a copying apparatus and said input means comprises a reading section for reading an original to be copied.

* * * * *

UNITED STATES PATENT AND TRADEMARK OFFICE
CERTIFICATE OF CORRECTION

PATENT NO. : 5,648,800
DATED : July 15, 1997
INVENTOR(S) : Tomoyuki TAKEDA

It is certified that error appears in the above-identified patent and that said Letters Patent is hereby corrected as shown below:

ON THE COVER PAGE

AT [56] References Cited - FOREIGN PATENT DOCUMENTS:

"623969    1/1987    Japan" should read

--62-3969  1/1987    Japan--.

Signed and Sealed this

Sixth Day of January, 1998

Attest:

BRUCE LEHMAN

*Attesting Officer*       *Commissioner of Patents and Trademarks*